United States Patent
Shi et al.

(10) Patent No.: US 11,005,626 B2
(45) Date of Patent: May 11, 2021

(54) PARAMETER CONFIGURATION METHOD AND RELATED PRODUCTS

(71) Applicant: GUANGDONG OPPO MOBILE TELECOMMUNICATIONS CORP., LTD., Dongguan (CN)

(72) Inventors: Zhihua Shi, Dongguan (CN); Wenhong Chen, Dongguan (CN); Zhi Zhang, Dongguan (CN)

(73) Assignee: GUANGDONG OPPO MOBILE TELECOMMUNICATIONS CORP. LTD., Guangdong (CN)

(*) Notice: Subject to any disclaimer, the term of this patent is extended or adjusted under 35 U.S.C. 154(b) by 0 days.

(21) Appl. No.: 16/904,340

(22) Filed: Jun. 17, 2020

(65) Prior Publication Data
US 2020/0322106 A1    Oct. 8, 2020

Related U.S. Application Data

(63) Continuation of application No. PCT/CN2018/072514, filed on Jan. 12, 2018.

(51) Int. Cl.
*H04W 4/00* (2018.01)
*H04L 5/00* (2006.01)
(Continued)

(52) U.S. Cl.
CPC .......... *H04L 5/0048* (2013.01); *H04L 5/0007* (2013.01); *H04L 5/0094* (2013.01);
(Continued)

(58) Field of Classification Search
None
See application file for complete search history.

(56) References Cited

U.S. PATENT DOCUMENTS

| 2019/0296877 A1* | 9/2019 | Zhang | H04W 72/042 |
| 2019/0305908 A1* | 10/2019 | Lee | H04L 1/0009 |
| 2020/0220675 A1* | 7/2020 | Lee | H04L 5/0026 |

FOREIGN PATENT DOCUMENTS

| CN | 102783100 A | 11/2012 |
| CN | 103718629 A | 4/2014 |

(Continued)

OTHER PUBLICATIONS

Guangdong OPPO Mobile Telecommunications Corp. Ltd., International Search Report and Written Opinion, PCT/CN2018/072514, dated Oct. 16, 2018, 8 pgs.
3GPP-TSG-RAN WG1#88bis, RF1706745, "Way Forward on Bandwith Part in NR," Spokane, USA, Apr. 7, 2017, 2 pgs.

(Continued)

*Primary Examiner* — Clemence S Han
(74) *Attorney, Agent, or Firm* — Morgan, Lewis & Bockius LLP (57) ABSTRACT

Disclosed in the embodiments of the present application are a parameter configuration method and related products, the method includes: receiving, by a terminal, at least one preset parameter of a phase tracking reference signal PT-RS from a network device, wherein the at least one preset parameter of the PT-RS is configured for at least one bandwidth part BWP of the terminal, and the at least one preset parameter is used for indicating resource information that needs to be used by the terminal when the terminal sends or receives the PT-RS on the at least one BWP.

14 Claims, 3 Drawing Sheets

(51) Int. Cl.
*H04W 24/02* (2009.01)
*H04W 72/04* (2009.01)

(52) U.S. Cl.
CPC ......... *H04W 24/02* (2013.01); *H04W 72/042* (2013.01); *H04W 72/0413* (2013.01)

(56) References Cited

FOREIGN PATENT DOCUMENTS

| | | |
|---|---|---|
| CN | 107155187 A | 9/2017 |
| CN | 107370571 A | 11/2017 |

OTHER PUBLICATIONS

3GPP; Technical Specification Group Radio Access Network; NR; "Physical layer procedures for data", (Release 15) (R1-1721051), V1.2.0, Nov. 2017, 55 pgs.

3GPP-TSG-RAN WG1 #88bis, R1-1706745, "Way Forward on Bandwidth Part in NR," Spokane, USA, Apr. 3-7, 2017, 2 pgs.

Guangdong OPPO Mobile Telecommunications Corp. Ltd., Extended European Search Report, EP18900058.1, dated Mar. 4, 2021, 13 pgs.

Ericsson, "LS related to phase tracking reference signal (PT-RS) design," 3GPP TSG RAN WG1 Meeting #89, R1-1709658, Hangzhou, China, May 15-19, 2017, 2 pgs.

Ericsson, "Review issue list for TS 38.331 EN-DC ASN.1 freeze," 3GPP TSG-RAN2#AH-1801, Tdoc R2-18xxxxx, Vancouver, Canada, Jan. 22-26 2018, 201 pgs.

Huawei, HiSilicon, "Reference Signal for fine time and frequency tracking," 3GPP TSG RAN WG1 Meeting #89, R1-1706939, Hangzhou, China. May 15-19, 2017, 6 pgs.

Nokia, Alcatel-Lucent Shanghai Bell, "Discussion on PT-RS design for CP-OFDM," 3GPP TSG RAN WG1#89, R1-1708927, Hangzhou, P.R. China, May 15-19, 2017, 10 pgs.

* cited by examiner

FIG. 8

PARAMETER CONFIGURATION METHOD AND RELATED PRODUCTS

CROSS-REFERENCE TO RELATED APPLICATION

The present application is a continuation of PCT Application No. PCT/CN2018/072514, filed Jan. 12, 2018, the content of which is hereby incorporated by reference in its entirety.

BACKGROUND

Technical Field

This application relates to the field of communications technologies, and in particular, to a parameter configuration method and a related product.

Related Art

In new radio (NR), a carrier may include a plurality of bandwidth parts (BWP). For a terminal, only one uplink BWP can be activated at one moment and used for uplink transmission. Similarly, only one downlink BWP can be activated at one moment and used for downlink transmission. A BWP of the terminal that is currently activated is indicated by using downlink control information (DCI) or the like. The BWP used by the terminal for transmission can be dynamically switched among a plurality of BWPs in a carrier. How to efficiently configure a terminal to perform transmission on different BWPs is a technical problem that needs to be resolved.

SUMMARY

Embodiments of this application provide a parameter configuration method and a related product, to help improve flexibility of configuring a BWP by a PT-RS.

According to a first aspect, an embodiment of this application provides a parameter configuration method, including:

indicating, by a network device, a preset parameter of a phase tracking reference signal PT-RS to a terminal, where the preset parameter of the PT-RS is configured for a bandwidth part BWP of the terminal, and the preset parameter is used for indicating resource information that needs to be used by the terminal when the terminal sends or receives the PT-RS on the BWP.

According to a second aspect, an embodiment of this application provides a parameter configuration method, including:

receiving, by a terminal, a preset parameter of a phase tracking reference signal PT-RS from a network device, where the preset parameter of the PT-RS is configured for a bandwidth part BWP of the terminal, and the preset parameter is used for indicating resource information that needs to be used by the terminal when the terminal sends or receives the PT-RS on the BWP.

According to a third aspect, an embodiment of this application provides a network device. The network device has a function of implementing behavior of the first network device in the foregoing method designs. The function may be implemented by hardware, or may be implemented by executing corresponding software by hardware. The hardware or the software includes one or more modules corresponding to the foregoing functions. In a possible design, the network device includes a processor. The processor is configured to support the network device in performing the corresponding function in the foregoing method. Further, the network device may further include a transceiver. The transceiver is configured to support communication between the network device and a terminal. Further, the network device may further include a memory. The memory is configured to couple to the processor, and the memory stores a program instruction and data that are necessary for the network device.

According to a fourth aspect, an embodiment of this application provides a terminal. The terminal has a function of implementing behavior of the terminal in the foregoing method designs. The function may be implemented by hardware, or may be implemented by executing corresponding software by hardware. The hardware or the software includes one or more modules corresponding to the foregoing functions. In a possible design, the terminal includes a processor. The processor is configured to support the terminal in performing the corresponding function in the foregoing methods. Further, the terminal may further include a transceiver. The transceiver is configured to support communication between the terminal and a network device. Further, the terminal may further include a memory. The memory is configured to couple to the processor, and the memory stores a program instruction and data that are necessary for the terminal.

According to a fifth aspect, an embodiment of this application provides a network device, including a processor, a memory, a transceiver, and one or more programs. The one or more programs are stored in the memory and are configured to be executed by the processor. The program includes an instruction used for performing the steps in any one of the methods according to the first aspect of the embodiments of this application.

According to a sixth aspect, an embodiment of this application provides a terminal, including a processor, a memory, a communications interface, and one or more programs. The one or more programs are stored in the memory and are configured to be executed by the processor. The program includes an instruction used for performing the steps in any one of the methods according to the second aspect of the embodiments of this application.

According to a seventh aspect, an embodiment of this application provides a computer-readable storage medium. The computer-readable storage medium stores a computer program used in electronic data exchange. The computer program enables a computer to perform some or all of the steps described in any one of the methods according to the first aspect of the embodiments of this application.

According to an eighth aspect, an embodiment of this application provides a computer-readable storage medium. The computer-readable storage medium stores a computer program used in electronic data exchange. The computer program enables a computer to perform some or all of the steps described in any one of the methods according to the second aspect of the embodiments of this application.

According to a ninth aspect, an embodiment of this application provides a computer program product. The computer program product includes a computer program storing a non-transitory computer-readable storage medium. The computer program may be operated to enable a computer to perform some or all of the steps described in any one of the methods according to the first aspect of the embodiments of this application. The computer program product may be a software installation package.

According to a tenth aspect, an embodiment of this application provides a computer program product. The computer program product includes a computer program storing a non-transitory computer-readable storage medium. The computer program may be operated to enable a computer to perform some or all of the steps described in any one of the methods according to the second aspect of the embodiments of this application. The computer program product may be a software installation package.

It may be learned that, in the embodiments of this application, a network device indicates a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP. Because the preset parameter can determine the resource information that needs to be used by the terminal when the terminal sends or receives the PT-RS on the BWP, the terminal only needs to obtain the preset parameter of the PT-RS corresponding to a to-be-used BWP when switching the BWP, so that the resource information that needs to be used for sending or receiving the PT-RS is flexibly determined, thereby helping improve flexibility of configuring a BWP by a PT-RS.

BRIEF DESCRIPTION OF THE DRAWINGS

Accompanying drawings that need to be used in the description of embodiments or the prior art are simply described below.

DETAILED DESCRIPTION

The following describes technical solutions in embodiments of this application with reference to accompanying drawings.

Figure 1:
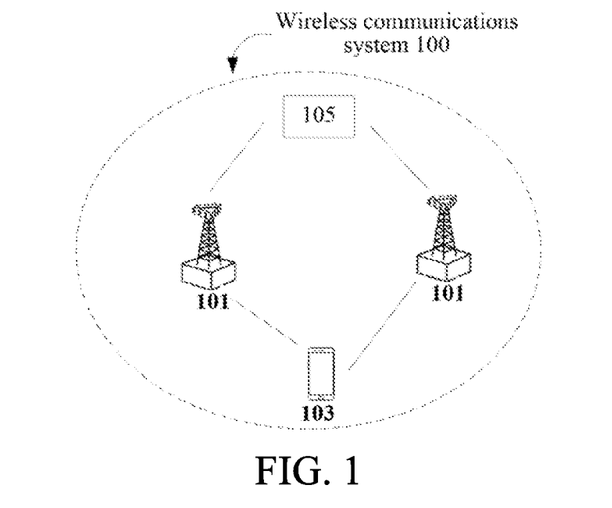
FIG. 1 is an example of a protocol architecture of a dual connectivity transmission mode supporting a data replication function according to an embodiment of this application.

FIG. 1 shows a wireless communications system related to this application. The wireless communications system may operate on a high frequency band, and may be a future evolved 5th generation mobile communications (the 5th Generation, 5G) system, a new radio (NR) system, a machine to machine communications (M2M) system, or the like. As shown in FIG. 1, the wireless communications system 100 may include: one or more network devices 101, one or more terminals 103, and a core network device 105.

The network device 101 may be a base station. The base station may be configured to communicate with one or more terminals, or may be configured to communicate with one or more base stations (for example, communicate with a macro base station and a micro base station such as an access point) that have some functions of a terminal. The base station may be a base transceiver station (BTS) in a time division synchronous code division multiple access (TD-SCDMA) system, or may be an evolved NodeB (eNB) in an LTE system, and a base station in the 5G system and the new radio (NR) system. Moreover, the base station may be an access point (AP), a transit node (Trans TRP), a central unit (CU), or another network entity, and may include some or all functions of the foregoing network entities. The core network device 105 includes a device on a core network side such as a serving gateway (SGW). The terminal 103 may be distributed in the entire wireless communications system 100, and may be static or moving. In some embodiments of this application, the terminal 103 may be a mobile device (for example, a smartphone), a mobile station, a mobile unit, an M2M terminal, a radio unit, a remote unit, a user agent, a mobile client, and the like.

It should be noted that, the wireless communications system 100 shown in FIG. 1 merely aims to more clearly describe the technical solutions in this application, but are not intended to limit this application. A person of ordinary skill in the art may know that as the network architectures evolve and a new business scenario emerges, the technical solutions provided in this application further apply to a similar technical problem.

Related technologies in this application are described as follows:

Currently, in an existing NR design, one terminal can configure a plurality of downlink DL BWPs or uplink UP BWPs, and relatively dynamically perform transmission on different BWPs by using manners such as DCI/media access control layer control element MAC CE, and the like.

However, in a current parameter configuration of a phase tracking reference signal (PT-RS), some parameters have been configured for BWPs, that is, related parameter configuration is independently performed for different BWPs, but some parameters have not, which affects flexibility of use of the PT-RS.

For the foregoing problem, embodiments of this application provide the following embodiments, and detailed descriptions are provided below with reference to the accompanying drawings.

Figure 2:
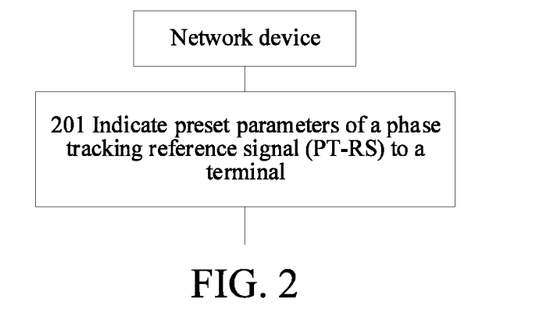
FIG. 2 is a schematic flowchart of a parameter configuration method according to an embodiment of this application.

FIG. 2 shows a parameter configuration method according to an embodiment of this application. The method is applied to the foregoing exemplary communications system, and the method includes:

In a 201 part, a network device indicates a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP.

The PT-RS is used for suppressing an impact of phase noise on system performance.

In a specific implementation, the network device indicates the preset parameter of the phase tracking reference signal PT-RS to the terminal by using radio resource control RRC signaling.

It may be learned that, in this embodiment of this application, a network device indicates a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP. Because the preset parameter can determine the resource information that needs to be used by the terminal when the terminal sends or receives the PT-RS on the BWP, the terminal only needs to obtain the preset parameter of the PT-RS corresponding to a to-be-used BWP when switching the BWP, so that the resource information that needs to be used for sending or receiving the PT-RS is flexibly determined, thereby helping improve flexibility of configuring a BWP by a PT-RS. For example, in different bandwidth parts BWP, one terminal may perform multi-user multiple-input multiple-output technology MU-MIMO paring (user paring for short) with different terminals. In this way, for different BWPs, the network device configures preset parameters of different PT-RSs, thereby flexibly performing the multi-user paring with other terminals on different BWPs.

In a possible embodiment, there is at least one preset parameter, and each preset parameter corresponds to one or more BWPs.

In a possible embodiment, the PT-RS includes a downlink DL PT-RS or an uplink UL PT-RS.

In a possible embodiment, the preset parameter includes at least one resource block RB offset parameter, and the RB offset parameter is used for indicating a physical resource block PRB location used by the terminal when the terminal sends or receives the PT-RS on the BWP.

For example, the network device configures M bandwidth parts BWP (which may be uplink BWPs, or downlink BWPs) for the terminal; and for the PT-RS, the network device configures N (N≤M) resource block RB offset parameters for the terminal. One resource block RB offset parameter corresponds to one or more BWPs. When the network device instructs, by using signaling, the terminal to activate a BWP, the terminal selects, according to the correspondence, a resource block RB offset parameter corresponding to the activated BWP, to determine an RB location used by the PT-RS.

It may be learned that, in this embodiment, RB locations used for performing PT-RS transmission are more flexibly configured on different BWPs by independently configuring resource block RB offset parameters for different BWPs.

In a possible embodiment, the preset parameter includes at least one resource element RE offset parameter, and the at least one RE offset parameter is used for indicating an RE location used by the terminal when the terminal sends or receives the PT-RS on the BWP.

For example, the network device configures M bandwidth parts BWP (which may be uplink BWPs, or downlink BWPs) for the terminal; and for the PT-RS, the network device configures N (N≤M) RE offset parameters for the terminal. One RE offset parameter corresponds to one or more BWPs. When the network device instructs, by using signaling, the terminal to activate a BWP, the terminal selects, according to the correspondence, an RE offset parameter corresponding to the activated BWP, to determine an RE location used by the PT-RS.

It may be learned that, in this embodiment, RE locations used for performing PT-RS transmission are more flexibly configured on different BWPs by independently configuring RE offset parameters for different BWPs.

In a possible embodiment, the preset parameter includes at least one power offset parameter, and the at least one power offset parameter is used for indicating a power of the terminal when the terminal sends or receives the PT-RS on the BWP.

For example, the network device configures M bandwidth parts BWP (which may be uplink BWPs, or downlink BWPs) for the terminal; and for the PT-RS, the network device configures N (N≤M) power offset parameters for the terminal. One power offset parameter corresponds to one or more BWPs. When the network device instructs, by using signaling, the terminal to activate a BWP, the terminal selects, according to the correspondence, a power offset parameter corresponding to the activated BWP, to determine a power used by the PT-RS.

It may be learned that, in this embodiment, a power used for performing PT-RS transmission is more flexibly configured on different BWPs by independently configuring power offset parameters for different BWPs.

In a possible embodiment, the network device configures the terminal to use a discrete Fourier transform spread orthogonal frequency division multiplexing technology DFT-S-OFDM, and the PT-RS is an uplink UL PT-RS.

The DFT-S-OFDM corresponds to a transform precoding technology.

It may be learned that, in this embodiment, for a terminal supporting the DFT-S-OFDM, resource information used for performing UL PT-RS transmission is more flexibly configured on different BWPs by independently configuring preset parameters of the UL PT-RSs for different BWPs.

In a possible embodiment, the preset parameter includes a time density, and the time density is used for determining a time domain location of the terminal when the terminal sends the PT-RS on the BWP.

For example, the network device configures M bandwidth parts BWP (which may be uplink BWPs, or downlink BWPs) for the terminal; and for the PT-RS, the network device configures N (N≤M) time domain densities for the terminal. One time density corresponds to one or more BWPs. When the network device instructs, by using signaling, the terminal to activate a BWP, the terminal selects, according to the correspondence, a time density corresponding to the activated BWP, to determine a time domain location used by the PT-RS.

It may be learned that, in this embodiment, time domain locations used for performing PT-RS transmission is more flexibly configured on different BWPs by independently configuring time domain densities for different BWPs.

Figure 3:
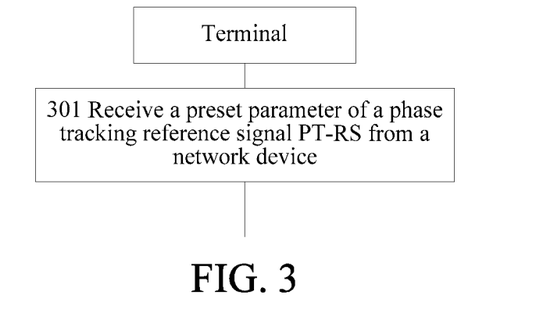
FIG. 3 is a schematic flowchart of a parameter configuration method according to an embodiment of this application.

Similar to the embodiment shown in FIG. 2, FIG. 3 shows another parameter configuration method according to an embodiment of this application. The method is applied to the foregoing exemplary communications system, and the method includes:

In a 301 part, a terminal receives a preset parameter of a phase tracking reference signal PT-RS from a network device. The preset parameter of the PT-RS is configured for a bandwidth part BWP of the terminal. The preset parameter is used for indicating resource information that needs to be used by the terminal when the terminal sends or receives the PT-RS on the BWP.

It may be learned that, in this embodiment of this application, because the preset parameter of the PT-RS can indicate the resource information that needs to be used by the terminal when the terminal sends or receives the PT-RS on the BWP, the terminal only needs to obtain the preset parameter when the BWP of the terminal is switched, so that the resource information used for sending or receiving the PT-RS on a to-be-used BWP is accurately determined, thereby helping improve flexibility of configuring a BWP by a PT-RS. For example, in different bandwidth parts BWP, one terminal may perform multi-user multiple-input multiple-output technology MU-MIMO paring with different terminals. In this way, for different BWPs, the network device configures preset parameters of different PT-RSs, thereby flexibly performing the multi-user paring with other terminals on different BWPs.

In a possible embodiment, there is at least one preset parameter, and each preset parameter corresponds to one or more BWPs.

In a possible embodiment, the PT-RS includes a downlink DL PT-RS or an uplink UL PT-RS.

In a possible embodiment, the preset parameter includes at least one resource block RB offset parameter, and the method further includes: determining, by the terminal according to the RB offset parameter, a physical resource block PRB location used by the terminal when the terminal sends or receives the PT-RS on the BWP.

For example, the network device configures M bandwidth parts BWP (which may be uplink BWPs, or downlink BWPs) for the terminal; and for the PT-RS, the network device configures N (N≤M) resource block RB offset parameters for the terminal. One resource block RB offset parameter corresponds to one or more BWPs. When the network device instructs, by using signaling, the terminal to activate a BWP, the terminal selects, according to the correspondence, a resource block RB offset parameter corresponding to the activated BWP, to determine an RB location used by the PT-RS.

It may be learned that, in this embodiment, RB locations used for performing PT-RS transmission are more flexibly configured on different BWPs by independently configuring resource block RB offset parameters for different BWPs.

In a possible embodiment, the preset parameter includes at least one resource element RE offset parameter, and the method further includes: determining, by the terminal according to the at least one RE offset parameter, an RE location used by the terminal when the terminal sends or receives the PT-RS on the BWP.

For example, the network device configures M bandwidth parts BWP (which may be uplink BWPs, or downlink BWPs) for the terminal; and for the PT-RS, the network device configures N (N≤M) RE offset parameters for the terminal. One RE offset parameter corresponds to one or more BWPs. When the network device instructs, by using signaling, the terminal to activate a BWP, the terminal selects, according to the correspondence, an RE offset parameter corresponding to the activated BWP, to determine an RE location used by the PT-RS.

It may be learned that, in this embodiment, RE locations used for performing PT-RS transmission are more flexibly configured on different BWPs by independently configuring RE offset parameters for different BWPs.

In a possible embodiment, the preset parameter includes at least one power offset parameter, and the method further includes: determining, by the terminal according to the at least one power offset parameter, a power of the terminal when the terminal sends or receives the PT-RS on the BWP.

For example, the network device configures M bandwidth parts BWP (which may be uplink BWPs, or downlink BWPs) for the terminal; and for the PT-RS, the network device configures N (N≤M) power offset parameters for the terminal. One power offset parameter corresponds to one or more BWPs. When the network device instructs, by using signaling, the terminal to activate a BWP, the terminal selects, according to the correspondence, a power offset parameter corresponding to the activated BWP, to determine a power used by the PT-RS.

It may be learned that, in this embodiment, a power used for performing PT-RS transmission is more flexibly configured on different BWPs by independently configuring power offset parameters for different BWPs.

In a possible embodiment, the terminal uses a discrete Fourier transform spread orthogonal frequency division multiplexing technology DFT-S-OFDM, and the PT-RS is an uplink UL PT-RS.

The DFT-S-OFDM corresponds to a transform precoding technology.

It may be learned that, in this embodiment, for a terminal supporting the DFT-S-OFDM, resource information used for performing UL PT-RS transmission is more flexibly configured on different BWPs by independently configuring preset parameters of the UL PT-RSs for different BWPs.

In a possible embodiment, the preset parameter includes a time density, and the method further includes: determining, by the terminal according to the time density, a time domain location of the terminal when the terminal sends the PT-RS on the BWP.

For example, the network device configures M bandwidth parts BWP (which may be uplink BWPs, or downlink BWPs) for the terminal; and for the PT-RS, the network device configures N (N≤M) time domain densities for the terminal. One time density corresponds to one or more BWPs. When the network device instructs, by using signaling, the terminal to activate a BWP, the terminal selects, according to the correspondence, a time density corresponding to the activated BWP, to determine a time domain location used by the PT-RS.

It may be learned that, in this embodiment, time domain locations used for performing PT-RS transmission is more flexibly configured on different BWPs by independently configuring time domain densities for different BWPs.

Figure 4:
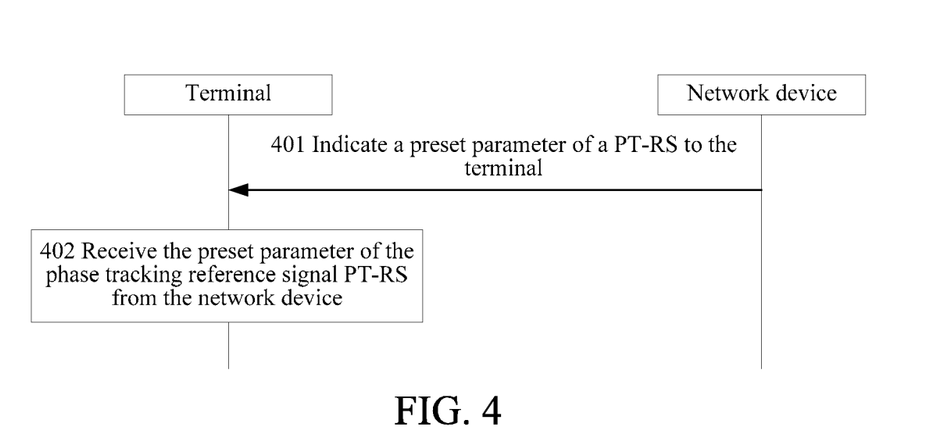
FIG. 4 is a schematic flowchart of a parameter configuration method according to an embodiment of this application.

Similar to the embodiments shown in FIG. 2 and FIG. 3, FIG. 4 shows a parameter configuration method according to an embodiment of this application. The method is applied to the foregoing exemplary communications system, and the method includes:

In a 401 part, a network device indicates a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP.

In a 402 part, the terminal receives the preset parameter of the phase tracking reference signal PT-RS from the network device. The preset parameter of the PT-RS is configured for the bandwidth part of the terminal. The preset parameter is used for indicating the resource information that needs to be used by the terminal when the terminal sends or receives the PT-RS on the BWP.

It may be learned that, in this embodiment of this application, a network device indicates a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP. Because the preset parameter can determine the resource information that needs to be used by the terminal when the terminal sends or receives the PT-RS on the BWP, the terminal only needs to obtain the preset parameter of the PT-RS corresponding to a to-be-used BWP when switching the BWP, so that the resource information that needs to be used for sending or receiving the PT-RS is flexibly determined, thereby helping improve flexibility of configuring a BWP by a PT-RS. For example, in different bandwidth parts BWP, one terminal may perform multi-user multiple-input multiple-output technology MU-MIMO paring with different terminals. In this way, for different BWPs, the network device configures preset parameters of different PT-RSs, thereby flexibly performing the multi-user paring with other terminals on different BWPs.

Figure 5:
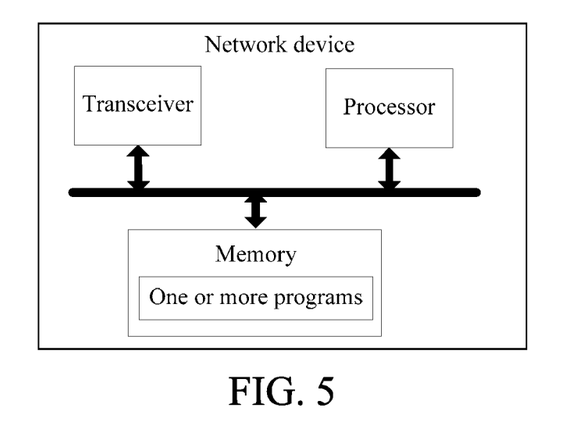
FIG. 5 is a schematic structural diagram of a network device according to an embodiment of this application.

Similar to the foregoing embodiments, FIG. 5 is a schematic structural diagram of a network device according to an embodiment of this application. The network device is a first network device. As shown in the figure, the network device includes a processor, a memory, a transceiver, and one or more programs. The one or more programs are stored in the memory and are configured to be executed by the processor. The program includes an instruction used for performing the following step.

A preset parameter of a phase tracking reference signal PT-RS is indicated to a terminal. The preset parameter of the PT-RS is configured for a bandwidth part BWP of the terminal. The preset parameter is used for indicating resource information that needs to be used by the terminal when the terminal sends or receives the PT-RS on the BWP.

It may be learned that, in this embodiment of this application, a network device indicates a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP. Because the preset parameter can determine the resource information that needs to be used by the terminal when the terminal sends or receives the PT-RS on the BWP, the terminal only needs to obtain the preset parameter of the PT-RS corresponding to a to-be-used BWP when switching the BWP, so that the resource information that needs to be used for sending or receiving the PT-RS is flexibly determined, thereby helping improve flexibility of configuring a BWP by a PT-RS. For example, in different bandwidth parts BWP, one terminal may perform multi-user multiple-input multiple-output technology MU-MIMO paring with different terminals. In this way, for different BWPs, the network device configures preset parameters of different PT-RSs, thereby flexibly performing the multi-user paring with other terminals on different BWPs.

In a possible embodiment, there is at least one preset parameter, and each preset parameter corresponds to one or more BWPs.

In a possible embodiment, the PT-RS includes a downlink DL PT-RS or an uplink UL PT-RS.

In a possible embodiment, the preset parameter includes at least one resource block RB offset parameter, and the at least one resource block RB offset parameter is used for indicating a physical resource block PRB location used by the terminal when the terminal sends or receives the PT-RS on the BWP.

In a possible embodiment, the preset parameter includes at least one resource element RE offset parameter, and the at least one RE offset parameter is used for indicating an RE location used by the terminal when the terminal sends or receives the PT-RS on the BWP.

In a possible embodiment, the preset parameter includes at least one power offset parameter, and the at least one power offset parameter is used for indicating a power of the terminal when the terminal sends or receives the PT-RS on the BWP.

In a possible embodiment, the network device configures the terminal to use a discrete Fourier transform spread orthogonal frequency division multiplexing technology DFT-S-OFDM, and the PT-RS is an uplink UL PT-RS.

In a possible embodiment, the preset parameter includes a time density, and the time density is used for determining a time domain location of the terminal when the terminal sends the PT-RS on the BWP.

Figure 6:
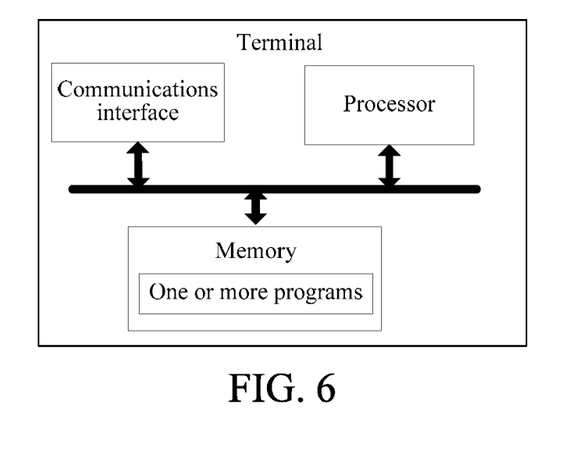
FIG. 6 is a schematic structural diagram of a terminal according to an embodiment of this application.

Similar to the foregoing embodiments, FIG. 6 is a schematic structural diagram of a terminal according to an embodiment of this application. As shown in the figure, the terminal includes a processor, a memory, a communications interface, and one or more programs. The one or more programs are stored in the memory and are configured to be executed by the processor. The program includes an instruction used for performing the following step.

A preset parameter of a phase tracking reference signal PT-RS from a network device is received. The preset parameter of the PT-RS is configured for a bandwidth part BWP of the terminal. The preset parameter is used for indicating resource information that needs to be used by the terminal when the terminal sends or receives the PT-RS on the BWP.

It may be learned that, in this embodiment of this application, because the preset parameter of the PT-RS can indicate the resource information that needs to be used by the terminal when the terminal sends or receives the PT-RS on the BWP, the terminal only needs to obtain the preset parameter when the BWP of the terminal is switched, so that the resource information used for sending or receiving the PT-RS on a to-be-used BWP is accurately determined, thereby helping improve flexibility of configuring a BWP by a PT-RS. For example, in different bandwidth parts BWP, one terminal may perform multi-user multiple-input multiple-output technology MU-MIMO paring with different terminals. In this way, for different BWPs, the network device configures preset parameters of different PT-RSs, thereby flexibly performing the multi-user paring with other terminals on different BWPs.

In a possible embodiment, there is at least one preset parameter, and each preset parameter corresponds to one or more BWPs.

In a possible embodiment, the PT-RS includes a downlink DL PT-RS or an uplink UL PT-RS.

In a possible embodiment, the preset parameter includes at least one resource block RB offset parameter. The program further includes an instruction used for performing the following operation: determining, according to the at least one RB offset parameter, a physical resource block PRB location used when sending or receiving the PT-RS on the BWP.

In a possible embodiment, the preset parameter includes at least one resource element RE offset parameter. The program further includes an instruction used for performing the following operation: determining, according to the at least one RE offset parameter, an RE location used when sending or receiving the PT-RS on the BWP.

In a possible embodiment, the preset parameter includes at least one power offset parameter. The program further includes an instruction used for performing the following operation: determining, according to the at least one power offset parameter, a power when sending or receiving the PT-RS on the BWP.

In a possible embodiment, the terminal uses a discrete Fourier transform spread orthogonal frequency division multiplexing technology DFT-S-OFDM, and the PT-RS is an uplink UL PT-RS.

In a possible embodiment, the preset parameter includes a time density. The program further includes an instruction used for performing the following operation: determining, according to the time density, a time domain location when sending the PT-RS on the BWP.

The foregoing describes the solutions in the embodiments of this application mainly from the perspective of interaction between network elements. It may be understood that, to implement the foregoing functions, the terminal and the network device include a corresponding hardware structure and/or a software module that executes each function. A person skilled in the art should easily be aware that, in combination with the examples of units and algorithm steps described in the embodiments disclosed in this specification, this application can be implemented by hardware or a combination of hardware and computer software. Whether a function is performed by hardware or computer software driving hardware depends on particular applications and design constraints of the technical solutions. A person skilled in the art may use different methods to implement the described functions for the particular applications, but it should not be considered that the implementation goes beyond the scope of this application.

In the embodiments of this application, division of functional units may be performed on the terminal and the network device according to the foregoing examples of methods. For example, various functional units may correspond to various functions, or two or more functions may be integrated in one processing unit. The foregoing integrated unit may be implemented in a form of hardware, or may be implemented in a form of a software program module. It should be noted that in the embodiments of this application, the module division is an example, and is merely logical function division, and there may be other division in actual applications.

Figure 7:
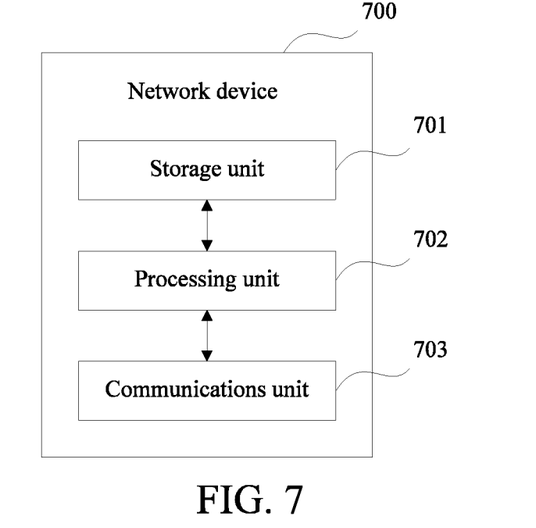
FIG. 7 is a schematic structural diagram of a network device according to an embodiment of this application.

When an integrated unit is used, FIG. 7 is a possible composition block diagram of functional units of the network device used in the foregoing embodiments. The network device is a first network device. The network device 700 includes: a processing unit 702 and a communications unit 703. The processing unit 702 is configured to control and manage actions of the network device. For example, the processing unit 702 is configured to support the network device in performing step 201 in FIG. 2, step 401 in FIG. 4, and/or another process in the technology described in this specification. The communications unit 703 is configured to support the network device in communicating with another device, for example, communicating with the terminal shown in FIG. 6. The network device may further include a storage unit 701, configured to store program code and data of the network device.

The processing unit 702 may be a processor or a controller. The communications unit 703 may be a transceiver, a transmitting and receiving circuit, a radio frequency chip, or the like. The storage unit 701 may be a memory.

The processing unit 702 is configured to indicate, by using the communications unit, a preset parameter of a phase tracking reference signal PT-RS to a terminal. The preset parameter of the PT-RS is configured for a bandwidth part BWP of the terminal. The preset parameter is used for indicating resource information that needs to be used by the terminal when the terminal sends or receives the PT-RS on the BWP.

In a possible embodiment, there is at least one preset parameter, and each preset parameter corresponds to one or more BWPs.

In a possible embodiment, the PT-RS includes a downlink DL PT-RS or an uplink UL PT-RS.

In a possible embodiment, the preset parameter includes at least one resource block RB offset parameter, and the at least one resource block RB offset parameter is used for indicating a physical resource block PRB location used by the terminal when the terminal sends or receives the PT-RS on the BWP.

In a possible embodiment, the preset parameter includes at least one resource element RE offset parameter, and the at least one RE offset parameter is used for indicating an RE location used by the terminal when the terminal sends or receives the PT-RS on the BWP.

In a possible embodiment, the preset parameter includes at least one power offset parameter, and the at least one power offset parameter is used for indicating a power of the terminal when the terminal sends or receives the PT-RS on the BWP.

In a possible embodiment, the network device configures the terminal to use a discrete Fourier transform spread orthogonal frequency division multiplexing technology DFT-S-OFDM, and the PT-RS is an uplink UL PT-RS.

In a possible embodiment, the preset parameter includes a time density, and the time density is used for determining a time domain location of the terminal when the terminal sends the PT-RS on the BWP.

When the processing unit 702 is a processor, the communications unit 703 is a communications interface, and the storage unit 701 is a memory, the network device in this embodiment of this application may be the network device shown in FIG. 5.

Figure 8:
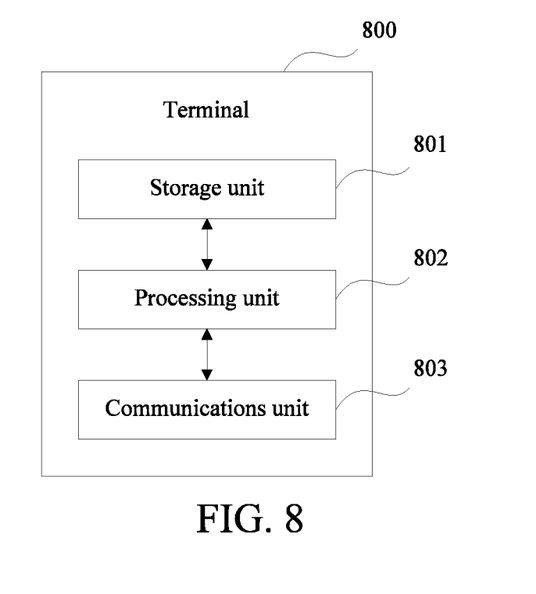
FIG. 8 is a schematic structural diagram of a terminal according to an embodiment of this application.

When an integrated unit is used, FIG. 8 is a possible composition block diagram of functional units of the terminal used in the foregoing embodiments. The terminal 800 includes a processing unit 802 and a communications unit 803. The processing unit 802 is configured to control and manage actions of the terminal. For example, the processing unit 802 is configured to support the terminal in performing step 301 in FIG. 3, step 402 in FIG. 4, and/or another process in the technology described in this specification. The communications unit 803 is configured to support the terminal in communicating with another device, for example, communicating with the network device shown in FIG. 5. The terminal may further include a storage unit 801, configured to store program code and data of the terminal.

The processing unit 802 may be a processor or a controller, and for example, may be a central processing unit (CPU), a general-purpose processor, a digital signal processor (DSP), an application-specific integrated circuit (ASIC), a field programmable gate array (FPGA) or another programmable logic device, a transistor logic device, a hardware component, or any combination thereof. The controller/processor may implement or execute various examples of logical blocks, modules, and circuits described with reference to content disclosed in this application. Alternatively, the processor may be a combination that implements a calculation function, for example, including one microprocessor or a combination of a plurality of microprocessors, or a combination of a DSP and a microprocessor. The communications unit 803 may be a transceiver, a transmitting and receiving circuit, or the like. The storage unit 801 may be a memory.

The processing unit 802 is configured to receive a preset parameter of a phase tracking reference signal PT-RS from a network device. The preset parameter of the PT-RS is configured for a bandwidth part BWP of the terminal. The preset parameter is used for indicating resource information that needs to be used by the terminal when the terminal sends or receives the PT-RS on the BWP.

In a possible embodiment, there is at least one preset parameter, and each preset parameter corresponds to one or more BWPs.

In a possible embodiment, the PT-RS includes a downlink DL PT-RS or an uplink UL PT-RS.

In a possible embodiment, the preset parameter includes at least one resource block RB offset parameter. The processing unit 802 is further configured to determine, according to the at least one RB offset parameter, a physical resource block PRB location used when sending or receiving the PT-RS on the BWP.

In a possible embodiment, the preset parameter includes at least one resource element RE offset parameter. The processing unit 802 is further configured to determine, according to the at least one RE offset parameter, an RE location used when sending or receiving the PT-RS on the BWP.

In a possible embodiment, the preset parameter includes at least one power offset parameter. The processing unit 802 is further configured to determine, according to the at least one power offset parameter, a power when sending or receiving the PT-RS on the BWP.

In a possible embodiment, the terminal uses a discrete Fourier transform spread orthogonal frequency division multiplexing technology DFT-S-OFDM, and the PT-RS is an uplink UL PT-RS.

In a possible embodiment, the preset parameter includes a time density. The processing unit 802 is further configured to determine, according to the time density, a time domain location when sending the PT-RS on the BWP.

When the processing unit 802 is a processor, the communications unit 803 is a communications interface, and the storage unit 801 is a memory, the terminal in this embodiment of this application may be the terminal shown in FIG. 6.

An embodiment of this application further provides a computer-readable storage medium. The computer-readable storage medium stores a computer program used in electronic data exchange. The computer program enables a computer to perform some or all of the steps described about the terminal in the foregoing method embodiments.

An embodiment of this application further provides a computer-readable storage medium. The computer-readable storage medium stores a computer program used in electronic data exchange. The computer program enables a computer to perform some or all of the steps described about the network device in the foregoing method embodiments.

An embodiment of this application further provides a computer program product. The computer program product includes a computer program storing a non-transitory computer-readable storage medium. The computer program may be operated to enable a computer to perform some or all of the steps described about the terminal in the foregoing method embodiments. The computer program product may be a software installation package.

An embodiment of this application further provides a computer program product. The computer program product includes a computer program storing a non-transitory computer-readable storage medium. The computer program may be operated to enable a computer to perform some or all of the steps described about the network device in the foregoing methods. The computer program product may be a software installation package.

Steps of the methods or algorithms described in the embodiments of this application may be implemented by hardware, or may be implemented by a processor executing a software instruction. The software instruction may include a corresponding software module. The software module may be stored in a random access memory (RAM), a flash memory, a read-only memory (ROM), an erasable programmable read-only memory (EPROM), an electrically erasable programmable read-only memory (EEPROM), a register, a hard disk, a removable hard disk, a compact disc read-only memory (CD-ROM), or any other form of storage medium well-known in the art. For example, a storage medium is coupled to the processor, so that the processor can read information from the storage medium and can write information into the storage medium. Certainly, the storage medium may alternatively be a component of a processor. The processor and the storage medium may be located in the ASIC. In addition, the ASIC may be located in an access network device, a target network device, or a core network device. Certainly, the processor and the storage medium may alternatively exist, as discrete components, in the access network device, the target network device, or the core network device.

A person skilled in the art may be aware that in one or more of the foregoing examples, all or some of the functions described in the embodiments of this application may be implemented by using software, hardware, firmware, or any combination thereof. When software is used for implementing the embodiments, all or some of the embodiments may be implemented in a form of a computer program product. The computer program product includes one or more computer instructions. When the computer program instructions are loaded and executed on a computer, the procedures or functions according to the embodiments of this application are completely or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, by using a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a digital video disc (DVD)), a semiconductor medium (for example, a solid state disk (SSD)), or the like.

The objectives, technical solutions, and benefits of the embodiments of this application are further described in detail in the foregoing specific embodiments. It should be understood that the foregoing descriptions are merely specific implementations of the embodiments of this application, but are not intended to limit the protection scope of the embodiments of this application. Any modification, equivalent replacement or improvement made based on the technical solutions in the embodiments of this application shall fall within the protection scope of the embodiments of this application.

What is claimed is:

1. A parameter configuration method, comprising:
receiving, by a terminal, at least one preset parameter of a phase tracking reference signal (PT-RS) from a network device, wherein the at least one preset parameter of the PT-RS is configured for at least one bandwidth part (BWP) of the terminal, the at least one preset parameter is used for indicating resource information that needs to be used by the terminal when the terminal sends or receives the PT-RS on the at least one BWP, and each of the at least one preset parameter corresponds to one or more BWPs; and
selecting, by the terminal when performing transmission on an activated BWP among the at least one BWP, a preset parameter corresponding to the activated BWP from the at least one preset parameter, wherein the at least one preset parameter comprises at least one resource element (RE) offset parameter.

2. The method according to claim 1, wherein the PT-RS comprises a downlink (DL) PT-RS or an uplink (UL) PT-RS.

3. The method according to claim 1, wherein the at least one preset parameter comprises at least one resource block (RB) offset parameter, and the method further comprises:
determining, by the terminal according to the at least one RB offset parameter, a physical resource block (PRB) location used by the terminal when the terminal sends or receives the PT-RS on the at least one BWP.

4. The method according to claim 1, wherein the method further comprises:
determining, by the terminal according to the at least one RE offset parameter, an RE location used by the terminal when the terminal sends or receives the PT-RS on the at least one BWP.

5. The method according to claim 1, wherein the at least one preset parameter comprises at least one power offset parameter, and the method further comprises:
determining, by the terminal according to the at least one power offset parameter, a power of the terminal when the terminal sends or receives the PT-RS on the at least one BWP.

6. The method according to claim 1, wherein the terminal uses a discrete Fourier transform spread orthogonal frequency division multiplexing technology (DFT-S-OFDM), and the PT-RS is an uplink (UL) PT-RS.

7. The method according to claim 6, wherein the at least one preset parameter comprises a time density, and the method further comprises:
determining, by the terminal according to the time density, a time domain location of the terminal when the terminal sends the PT-RS on the at least one BWP.

8. A terminal, comprising a processor, a memory, a communications interface, and one or more programs, wherein the one or more programs are stored in the memory and are configured to be executed by the processor, and the processor, when executing the one or more programs program, is configured to:
receive, through the communications interface, at least one preset parameter of a phase tracking reference signal (PT-RS) from a network device, wherein the at least one preset parameter of the PT-RS is configured for at least one bandwidth part (BWP) of the terminal, and the at least one preset parameter is used for indicating resource information that needs to be used by the terminal when the terminal sends or receives the PT-RS on the at least one BWP, and each of the at least one preset parameter corresponds to one or more BWPs; and
select, when performing transmission on an activated BWP among the at least one BWP, a preset parameter corresponding to the activated BWP from the at least one preset parameter, wherein the at least one preset parameter comprises at least one resource element (RE) offset parameter.

9. The terminal according to claim 8, wherein the PT-RS comprises a downlink (DL) PT-RS or an uplink (UL) PT-RS.

10. The terminal according to claim 8, wherein the at least one preset parameter comprises at least one resource block (RB) offset parameter, and the processor is further configured to:
determine, according to the at least one RB offset parameter, a physical resource block (PRB) location used by the terminal when the terminal sends or receives the PT-RS on the at least one BWP.

11. The terminal according to claim 8, wherein the processor is further configured to:
determine, according to the at least one RE offset parameter, an RE location used by the terminal when the terminal sends or receives the PT-RS on the at least one BWP.

12. The terminal according to claim 8, wherein the at least one preset parameter comprises at least one power offset parameter, and the processor is further configured to:
determine, according to the at least one power offset parameter, a power of the terminal when the terminal sends or receives the PT-RS on the at least one BWP.

13. The terminal according to claim 8, wherein the terminal uses a discrete Fourier transform spread orthogonal frequency division multiplexing technology (DFT-S-OFDM) and the PT-RS is an uplink (UL) PT-RS.

14. The terminal according to claim 13, wherein the at least one preset parameter comprises a time density, and the processor is further configured to:
determine, according to the time density, a time domain location of the terminal when the terminal sends the PT-RS on the at least one BWP.

* * * * *